US006503605B1

(12) United States Patent
Paul-Lieberman

(10) Patent No.: US 6,503,605 B1
(45) Date of Patent: *Jan. 7, 2003

(54) LUMINESCENT CARDS WITH DETACHABLE DECORATIVE ITEMS AND METHOD OF MANUFACTURING LUMINESCENT CARDS WITH DETACHABLE DECORATIVE ITEMS

(76) Inventor: Kathleen Paul-Lieberman, 504 Raton Pass, Irving, TX (US) 75063

( * ) Notice: Subject to any disclaimer, the term of this patent is extended or adjusted under 35 U.S.C. 154(b) by 0 days.

This patent is subject to a terminal disclaimer.

(21) Appl. No.: 09/456,190

(22) Filed: Dec. 7, 1999

Related U.S. Application Data

(63) Continuation-in-part of application No. 08/859,502, filed on May 20, 1997, now Pat. No. 5,997,992.

(51) Int. Cl.[7] .......................... B32B 27/14; B32B 3/00; B32B 7/14; B32B 7/06

(52) U.S. Cl. ....................... 428/195; 428/341; 428/199; 428/203; 428/913; 428/202

(58) Field of Search ................................ 428/195, 341, 428/199, 203, 913, 202

(56) References Cited

U.S. PATENT DOCUMENTS 4,081,791 A * 3/1978 Pollard et al. ........... 340/146.3
5,248,082 A * 9/1993 Elmlinger .................. 229/303
5,647,168 A * 7/1997 Gilbert ......................... 47/72
5,752,647 A * 5/1998 Schubert et al. ........... 229/92.1

* cited by examiner

*Primary Examiner*—Cynthia H. Kelly
*Assistant Examiner*—L. Ferguson
(74) *Attorney, Agent, or Firm*—Melvin A. Hunn

(57) ABSTRACT

The present invention is directed to a decorative item. The decorative item includes a number of components which cooperate together. A layer of luminescent material is provided. The layer of luminescent material is preferably, but not necessarily, a substantially rigid and planar carrier. A translucent image is affixed to the layer of luminescent material. The decorative item is operable in a plurality of modes of operation, including an excitation mode of operation and a delayed light emission mode of operation. During the excitation mode of operation, the decorative item is exposed to a source of exciting energy, such as light. In the delayed light emission mode of operation, the layer of luminescent material generates a phosphorescent light emission, after the source of exciting energy is removed, which passes through the translucent image and makes it visible in low light conditions. The layer of luminescent material includes one or more detachable portions which may be separated along a die cut line or a preformed perforation. The replacement may detach these portions and utilize them as a decorative or utilitarian object.

19 Claims, 9 Drawing Sheets

Figure 16A
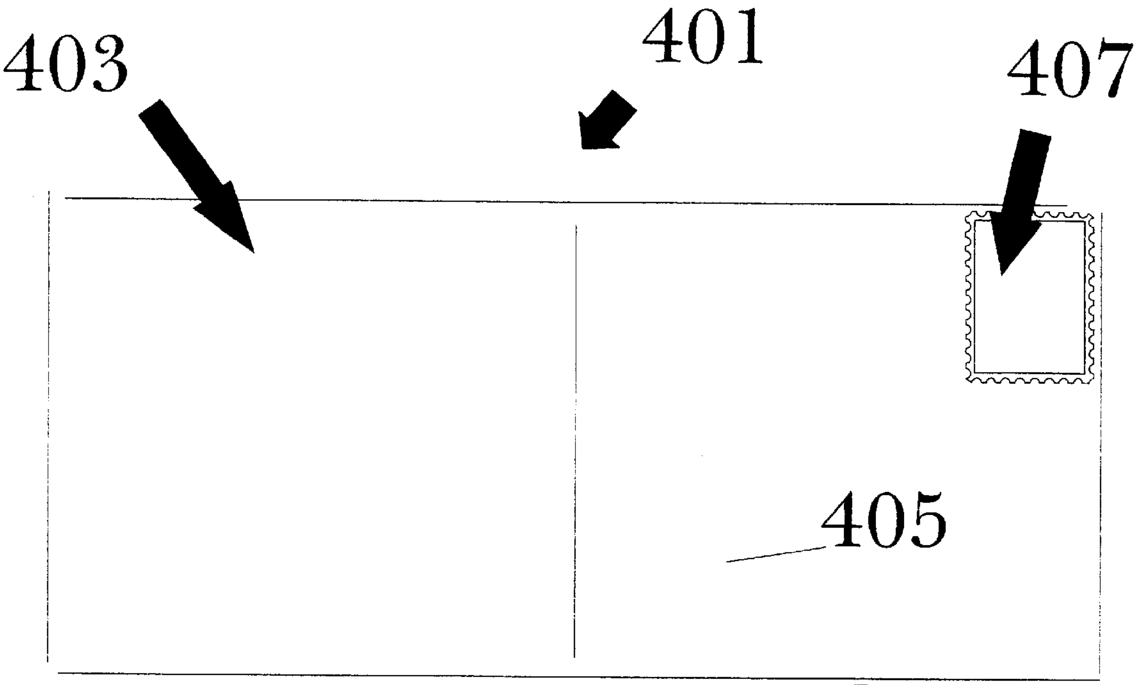
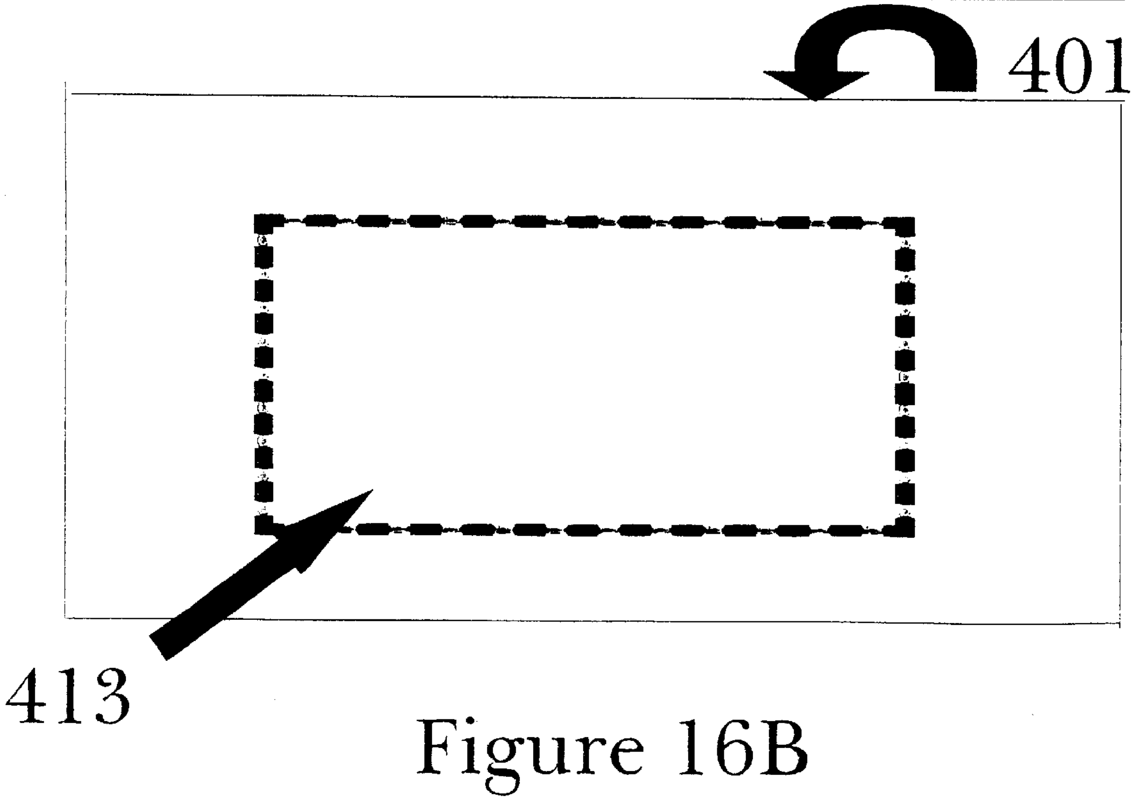
Figure 16B

LUMINESCENT CARDS WITH DETACHABLE DECORATIVE ITEMS AND METHOD OF MANUFACTURING LUMINESCENT CARDS WITH DETACHABLE DECORATIVE ITEMS

CROSS-REFERENCE TO RELATED APPLICATION

This application is a continuation-in-part of application Ser. No. 08/859,502, filed May 20, 1997, entitled "Luminescent Cards and Decorative Items and Method of Manufacturing Luminescent Cards and Decorative Items," further identified as U.S. Pat. No. 5,997,992, issued Dec. 7, 1999.

BACKGROUND OF THE INVENTION

1. Field of the Invention

This invention relates generally to greeting cards, bookmarks, and other decorative items.

2. Description of the Prior Art

The novelty, gift, and card industry is always open to new technical innovation, and especially innovation which helps the consumer and/or user to more effectively deliver personal messages to family members, friends, business associates and acquaintances. This has led to a variety of gift and card items which can be highly personalized. For example, it is now fairly common for individuals to have their own Christmas cards printed which include one or more photographs of the sender and his/her family. This results in a Christmas or other seasonal greeting which may be treasured and held by the recipient far longer than a preprinted and standard card. Another example of the highly customized novelty or greeting item is the greeting cards which are now commercially available that include a prerecorded voice or musical message which is personally generated by the sender, and which may be heard after a button is depressed, which causes a voice synthesizer to play a prerecorded message utilizing an audio output device, such as a piezoelectric crystal.

Such personalized card or gift items also have significant commercial value in the advertising specialty industry, allowing companies to personalize seasonal and other greetings in order to generate or maintain business.

SUMMARY OF THE INVENTION

It is one objective of the present invention to provide luminescent cards which include detachable decorative items, as well as a method of manufacturing the luminescent cards with detachable decorative or utilitarian items, wherein a translucent image is affixed to a luminescent carrier, which is energized when exposed to a source of exciting energy (such as light) and which serves to make the translucent image visible in low light conditions due to the phosphorescence (that is, the delayed light emission) of the luminescent material.

It is another objective of the present invention to utilize a luminescent carrier having a predetermined shape and other properties which render the decorative objective useful first as a "mailable" item such as a postcard (but which may be larger in size), but which includes detachable decorative or utilitarian items such as a Christmas tree ornament, a bookmark, a switchplate, a decorative wall ornament, components of a mobile, or any other utilitarian object which can serve both a utilitarian and a decorative function.

These and other objectives are achieved as is now described. The present invention is directed to a decorative item. The decorative item includes a number of components which cooperate together. A layer of luminescent material is provided. The layer of luminescent material is preferably, but not necessarily, a substantially rigid and planar carrier. A translucent image is affixed to the layer of luminescent material. The decorative item is operable in a plurality of modes of operation, including an excitation mode of operation and a delayed light emission mode of operation. During the excitation mode of operation, the decorative item is exposed to a source of exciting energy, such as light. In the delayed light emission mode of operation, the layer of luminescent material generates a phosphorescent light emission, after the source of exciting energy is removed, which passes through the translucent image and makes it visible in low light conditions.

One preferred embodiment of the present invention is to provide a decorative item which serves a dual function. First, it functions as a "postcard" type mailing device which allows one to send seasonal or other greetings to a recipient. The second function is that of a decorative item. Once the item has been received through the mail, portions of the luminescent material may be removed to provide a decorative item which can be framed, secured to a wall, put on a bulletin board, used as a bookmark, placed on a refrigerator, used as a switchplate or decorative wall item, hung in a mobile, or hung from a Christmas tree as a Christmas ornament. These are merely exemplary uses, and many other decorative uses are contemplated. In order to accomplish its mailing functions, the decorative item will include a correspondence portion which includes a message portion and an address portion. The message portion contains a private message which may be either visible (like a postcard) or obscured from view (like a letter). The address information is utilized for routing by the United States Postal Service and for placement of postage. This portion is visible during normal mailing procedures in order to allow the United States Postal Service to route the decorative item to its destination. Several embodiments of this decorative item are discussed in detail in this patent application. Numerous sized mailing items can utilize the present invention; the present invention is not limited to "postcard" sized mailing items.

Uses which require luminescent material in a shape other than that of a plane are also contemplated in the present invention. One preferred use is that of decorative spheres which include or are formed from a luminescent material, and which are imprinted with a translucent image (such as that of a planetary surface) which provide an attractive item when the material is luminescent.

BRIEF DESCRIPTION OF THE DRAWINGS

The novel features believed characteristic of the invention are set forth in the appended claims. The invention itself however, as well as a preferred mode of use, further objectives and advantages thereof, will best be understood by reference to the following detailed description of an illustrative embodiment when read in conjunction with the accompanying drawings, wherein:

FIGS. 12A and 112B are pictorial representations of yet another embodiment of a decorative item which may be utilized to mail messages.

FIGS. 16A, 16B, 16C, 16D, 16E, and 16F depict an alternative implementation of the present invention which is a combination mailing item and decorative item.

DETAILED DESCRIPTION OF PREFERRED EMBODIMENT

Figure 1:
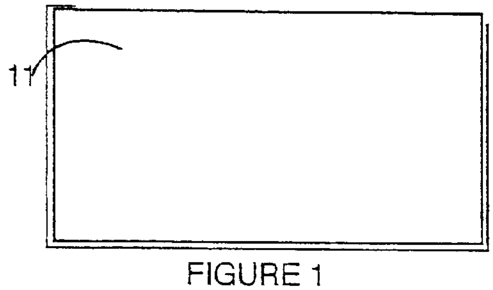
FIG. 1 depicts a layer of luminescent material.

FIG. 1 is a pictorial representation of the layer of luminescent material utilized to form decorative items in accordance with the present invention. In the preferred embodiment of the present invention, the layer of luminescent material 11 is a substantially planar and somewhat rigid sheet of material which includes luminescent material. The layer of luminescent material 11 may be formed of any type of conventional plastic, resin, or vinyl material. Any conventional luminescent material of the prior art can be utilized.

Luminescence is a physical property of material which causes the material to emit light in response to the receipt of energy. Chemiluminescence is the process by which a material gives off light in response to a chemical reaction. Bioluminescence is the process by which matter gives off light in response to a chemical reaction in a living system. Cathodoluminescence is the process by which material gives off light in response to electron bombardment. Radio luminescence is the process by which material gives off light in response to x-ray or gamma ray bombardment. Photoluminescence is the process by which matter gives off light in response to receipt of ultraviolet, visible, or infrared radiation. The term "fluorescence" is utilized to describe the process of light emission during excitation of the material. In contrast, the term "phosphorescence" is a term which describes the process of delayed light emission and which is sometimes referred to as "afterglow".

In the preferred embodiment of the present invention, layer of luminescent material 11 is preferably a photo luminescent material which exhibits phosphorescent properties. In other words, the layer of luminescent material 11 may be energized by exposure to ultraviolet, visible, or infrared radiation, and exhibits the property of delayed light emission, so that an afterglow effect is visible.

Figure 2:
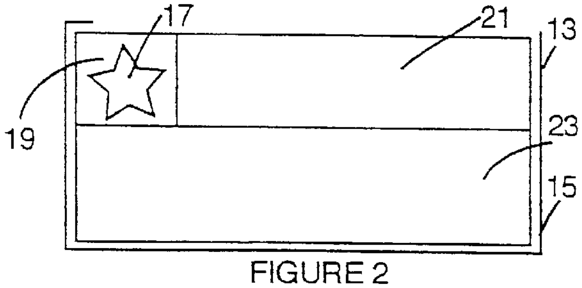
FIG. 2 depicts an image affixed to a layer of transparent material.

In accordance with the present invention, and as can be seen in FIG. 2, a translucent image is provided for affixation to layer of luminescent material 11. In the preferred embodiment of the present invention, translucent image is affixed to layer of transparent material 15. Preferably, layer of transparent material 15 comprises any transparent carrier which can serve to receive translucent image 13. As an alternative to the use of the transparent material, images may be directly printed or painted on the luminescent material. In accordance with the present invention, translucent image 13 may be a multicolored image, such as the Texas flag which is depicted at FIG. 2. Light should be allowed to pass through the white star 17, the blue background 19, and the white bar 21 and the red bar 23. If translucent image 13 is held up to a light source, the red and blue components pass red and blue light respectively. The clear components of translucent image 13 pass full spectrum light.

Figure 3:
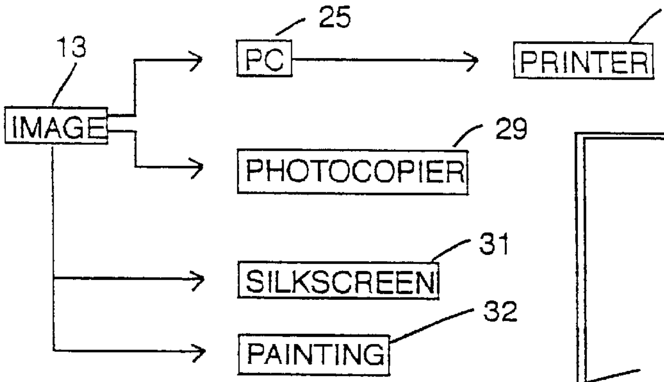
FIG. 3 depicts a variety of alternative means for generating the image on the layer of transparent material.

The translucent image 13 of FIG. 2 may be generated in a variety of ways, including those depicted in FIG. 3. As is shown, an image 13 may be acquired through any conventional means such as conventional photography or digital photography (that is, for direct use in personal computers). The image may be passed to personal computer 25 and printed on a transparency utilizing printer 27. Alternatively, translucent image 13 may be copied directly onto a transparency utilizing photocopier 29. Alternatively, translucent image 13 may be silk-screened using silk-screen apparatus 31.

Figure 4:
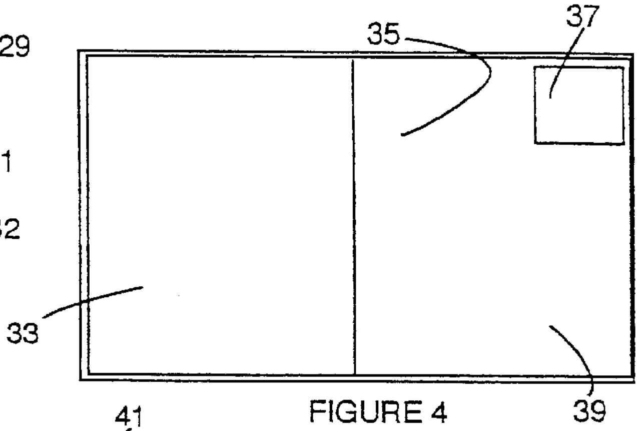
FIG. 4 depicts printed material which allows the decorative item to serve as a postcard.

In accordance with the present invention, the decorative item may be utilized to serve predefined utilitarian functions. For example, the decorative item may be utilized as a postcard, with the front of the card providing a phosphorescently illuminated image, and the back of the card providing a means for defining a postcard. FIG. 4 depicts the back of such a card, with printed material defining a separator bar 35 which separates postcard message area 33 from postcard mailing area 39. Additionally, a printed stamp area may be provided. Preprinted messages may also be provided on the card to provide instruction on the use of the decorative item.

Figure 5:
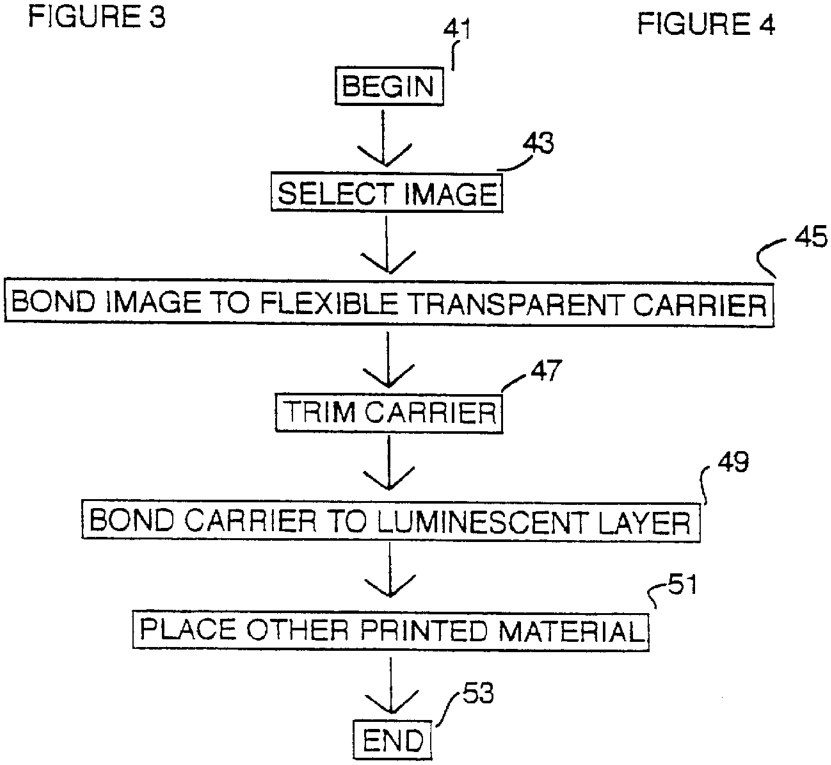
FIG. 5 is a flowchart representation of the preferred steps of manufacturing the decorative item in accordance with the present invention.

FIG. 5 is a flowchart representation of the method utilized to manufacture decorative items in accordance with the present invention. The process begins at step 41 and continues at step 43, wherein an image is selected. In accordance with step 45, the image is bonded to a flexible transparent carrier. Then, in accordance with step 47, the carrier is trimmed to an appropriate size. Next, in accordance with step 49, the carrier is bonded to the luminescent layer. Then, in accordance with step 51, any other printed material is located on the decorative item. For example, if the decorative item is to be a postcard, either labels are directly affixed to the back of layer of luminescent material 11, or the human readable text and images are directly printed on the layer of luminescent material 11. The process ends at step 53.

Figure 6:
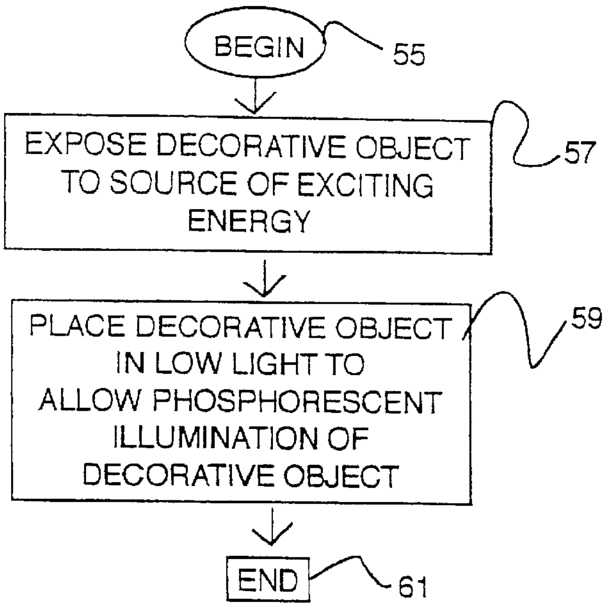
FIG. 6 is a flowchart which depicts the modes of operation of the decorative item.

FIG. 6 is a flowchart representation of the steps required to utilize the decorative item of the present invention. The process begins at step 55, and continues at step 57 wherein the decorative item is exposed to a source of exciting energy. In the preferred embodiment of the present invention, the layer of luminescent material 11 is composed of photo luminescent material, so the decorative item is exposed to ultraviolet, visible, or infrared radiation. If alternative luminescent materials are utilized, then it should be exposed to an appropriate source of exciting energy. Next, in accordance with step 59, the decorative item or object is placed in a low light condition to allow the phosphorescent illumination of the decorative object. The process ends at step 61.

Figure 7:
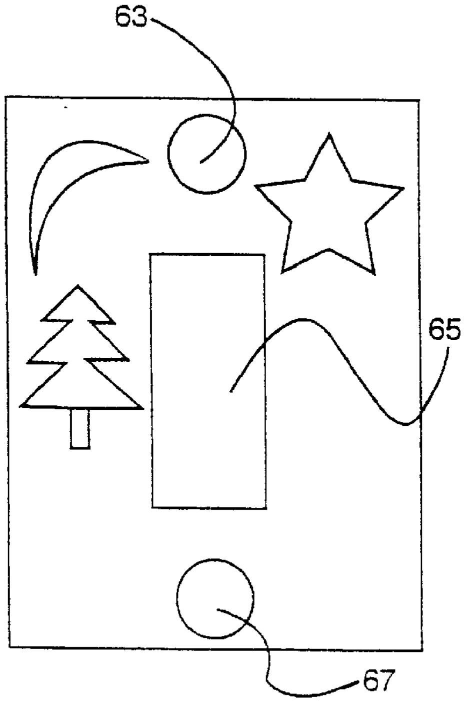
FIG. 7 depicts utilization of the decorative item as a switchplate.
Figure 8:
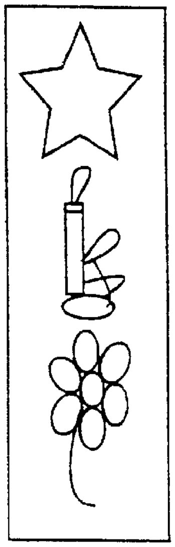
FIG. 8 depicts utilization of the decorative item as a bookmark.
Figure 9:
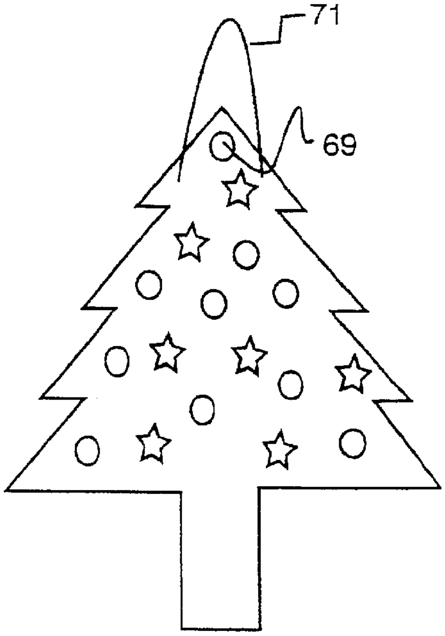
FIG. 9 depicts utilization of the decorative item as a Christmas tree ornament.

The decorative object of the present invention may be utilized on a variety of utilitarian objects. Such exemplary objects are depicted in FIGS. 7, 8, and 9. In FIG. 7, a variety of ports 63, 65, 67, are cut into the decorative object to allow it to serve as a switchplate for a light switch. Ports 63, 67, are adapted in size and shape to accommodate a fastening screw, while port 65 is adapted in size and shape to accommodate the light switch. FIG. 8 depicts utilization of the present invention to construct a bookmark. As is shown in FIG. 8, the bookmark is relatively narrow and relatively long in order to emulate the shape and configuration of conventional bookmarks. FIG. 9 depicts utilization of the present invention as a Christmas tree ornament. As is shown, the layer of luminescent material is cut in a fanciful shape (such as a Christmas tree, or any other decorative shape). A fastening port 69 is provided in the decorative object to allow a fastener 71 to be utilized for placing the decorative object on a Christmas tree or mantel.

Figure 10A:
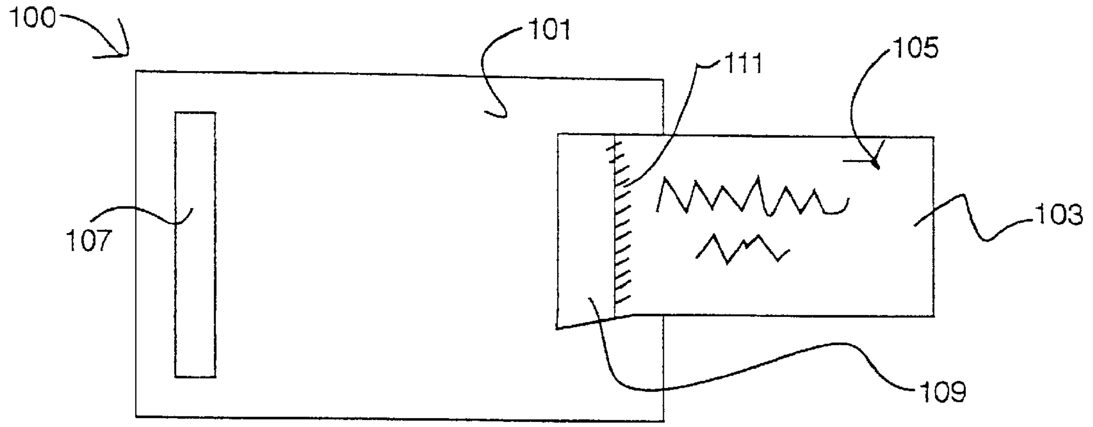
FIGS. 10A, 10B, and 10C are pictorial representations of one embodiment of the decorative item which can be utilized to mail personal messages.
Figure 10B:
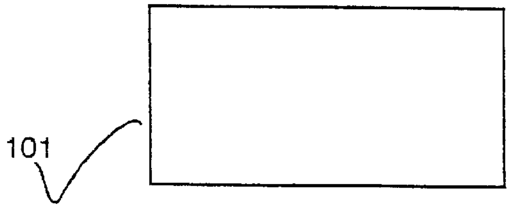
Figure 10C:
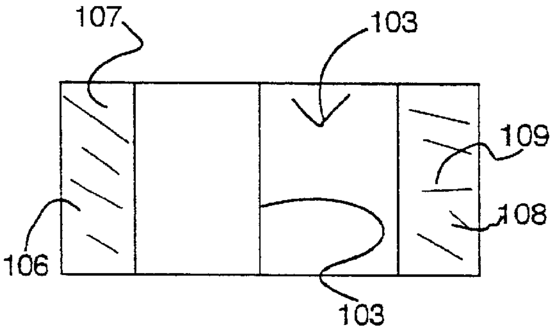

FIGS. 10A, 10B, and 10C depict another particular embodiment of the present invention which is utilized to send the decorative items through the postal service, and which allows for a personalized message to be carried thereon. FIG. 10A depicts decorative item 100 which includes a layer of luminescent material 101 which includes a translucent image affixed to the side obscured in the view of FIG. 10A. A planar panel 103 is provided with a message area 105 thereon which allows the sender to provide a personalized handwritten, typed, or printed message. The panel 103 is secured by connectors 107, 109, which are preferably paper panels which have an adhesive on one side. Panel 103 is connected to connectors 107, 109 through a perforated connection, such as perforation 111. The panel 103 and connectors 107, 109 are similar to the connector system utilized in the United States Postal Service certified mail return receipt. FIGS. 10B and 10C depict the decorative item 100 of FIG. 10A in alternative views. In FIG. 10B, a layer of luminescent material 101 is depicted side-by-side with panel 103. As is shown, connectors 107, 109 are secured through the perforated connection to panel 103. Preferably, but not necessarily, a layer of protective material 106, 108 is secured to maintain the adhesive out of contact with other materials. Preferably, the personalized message is written, typed, or printed on panel 103, then the protective material 106, 108 is removed, and panel 103 is secured thereto through the adhesive of connectors 107, 109 to the layer of luminescent material 101. FIG. 10C depicts the opposite side of panel 103. As is shown, preprinted material 113, 115 is provided to locate the stamp and address information.

Figure 11A:
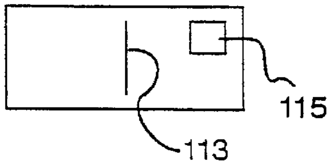
FIGS. 11A and 11B are pictorial representations of an alternative embodiment of the decorative item which may also be utilized to mail messages.
Figure 11A:
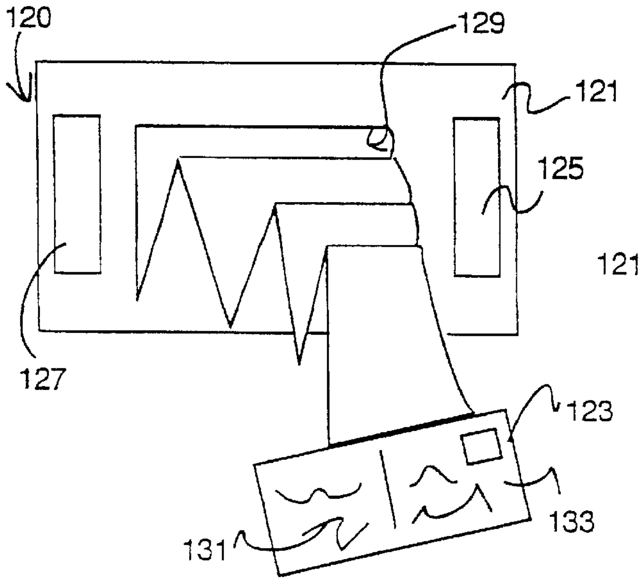
Figure 11B:
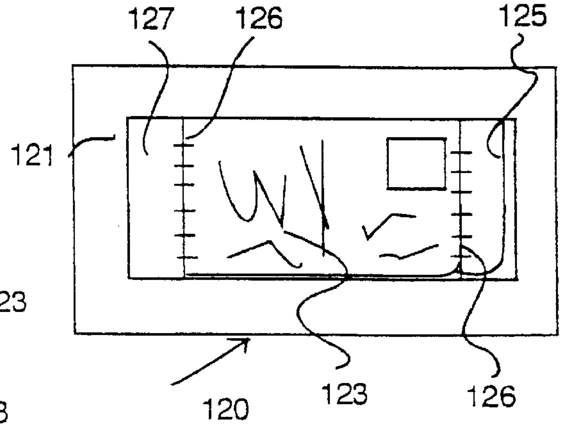

FIGS. 11A and 11B depict and alternative embodiment of the decorative item 120 which allows for a more lengthy message to be provided with decorative item 120. As is shown in FIG. 11A, decorative item 120 includes a layer of luminescent material 121 which includes a translucent image on its opposite side. Panel 123 is releasibly connected to layer of luminescent material 121 via connectors 125, 127 which are connected to panel 123 via a perforated connection. A folded message component 129 is connected between layer of luminescent material 121 and panel 123. The address and postage information 131, 133 is provided on the front side of panel 123. The message portion 129 extends between the layer of luminescent material 121 and panel 123. FIG. 11B depicts decorative item 120 with panel 123 secured in place relative to layer of luminescent material 121, and held in position by connectors 127, 125 which are attached to panel 123 by perforations 126, 128. Decorative item 120 travels through the United States Postal Service utilizing the address information and postage affixed to the outside portion of panel 123. During transport, the message portion 129 is obscured from view and held in a safe position between layer of luminescent material 121 and panel 123. Upon receipt, the recipient merely removes panel 123 by pulling it outward and allowing separation from connectors 127, 125 at perforations 126, 128 in order to unfold the message portion 129 as is depicted in FIG. 11A.

Figure 12A:
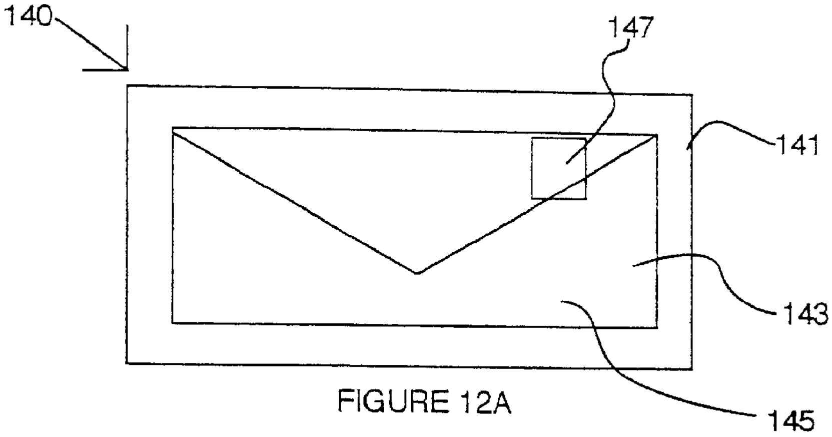
Figure 12B:
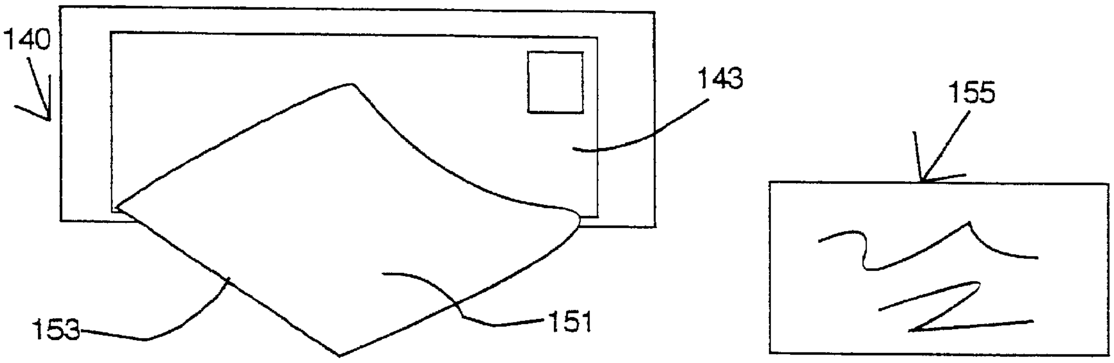

FIGS. 12A and 112B depict yet another alternative embodiment of decorative item 140. As is shown, layer of luminescent material 141 is provided, and an envelope structure 143 is also provided. Address information 145 and postage 147 are affixed to the envelope structure 143. As is shown in FIG. 112B, the envelope structure 143 includes a flap 151 which includes an adhesive material 153 (which may be a moisture-actuated glue, or any other conventional adhesive material). A written message 155 may be inserted within envelope structure 143, and flap 141 and adhesive 143 then utilized to seal the envelope structure 143 to prevent message 155 from either being read or lost in the mail.

Figure 13:
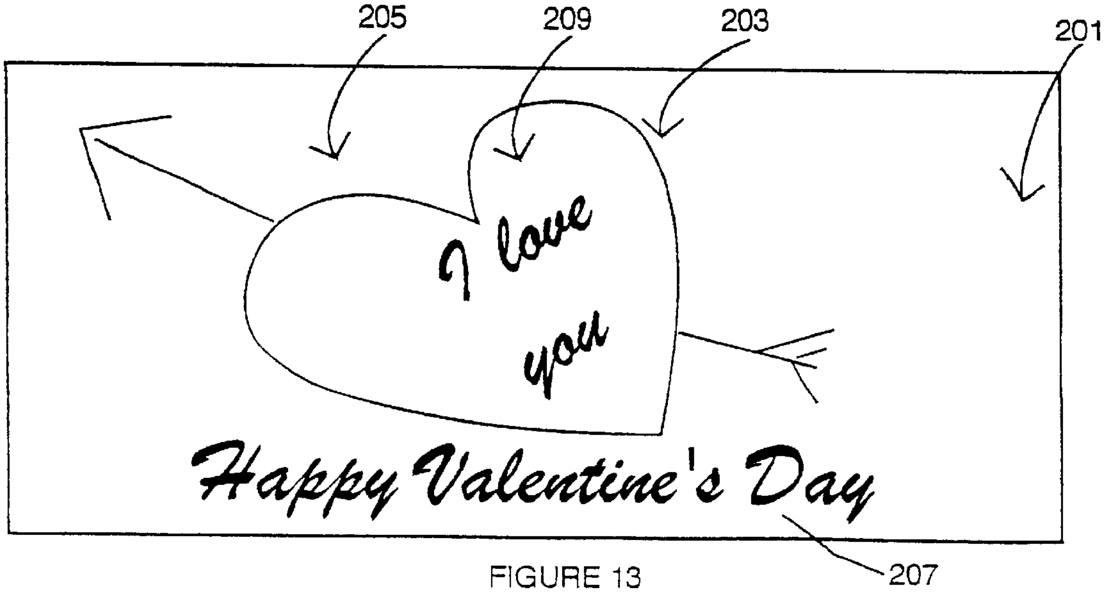
FIG. 13 is a pictorial representation of one type of translucent image which includes a "secret" message which may be read during the luminescent mode of operation.

FIG. 13 depicts one exemplary type of translucent message 203 which may be provided on layer of luminescent material 201. As is shown, the image includes human readable text 207, an image portion 205, and a textual portion 209 which is formed of an opaque color which is not translucent, and which is fairly unreadable in daylight. In the example of FIG. 13, the textual portion reads: "I love you". When the layer of luminescent material 211 provides luminescence, the opaque message 209 blocks the light from passing, and thus is visible. The net result is a message which is relatively unreadable in ordinary daylight, but which becomes more readable when the layer of luminescent material 201 provides luminescence.

Figure 14:
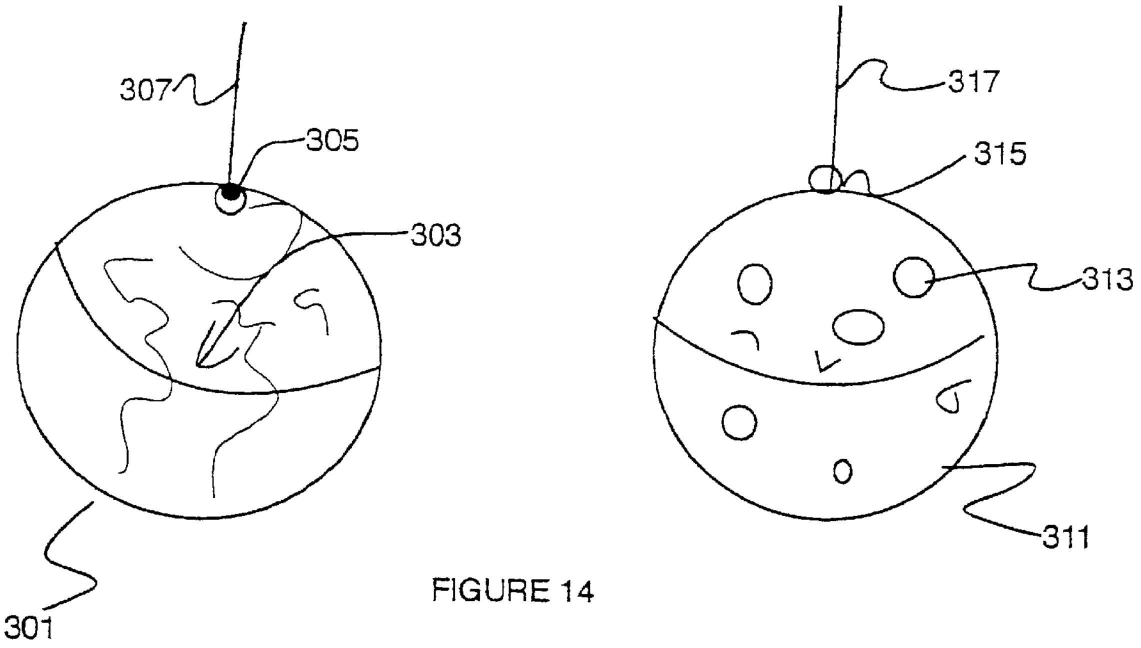
FIGS. 14 and 15 are pictorial representations of spherical luminescent objects which may be imprinted with translucent images.
Figure 15:
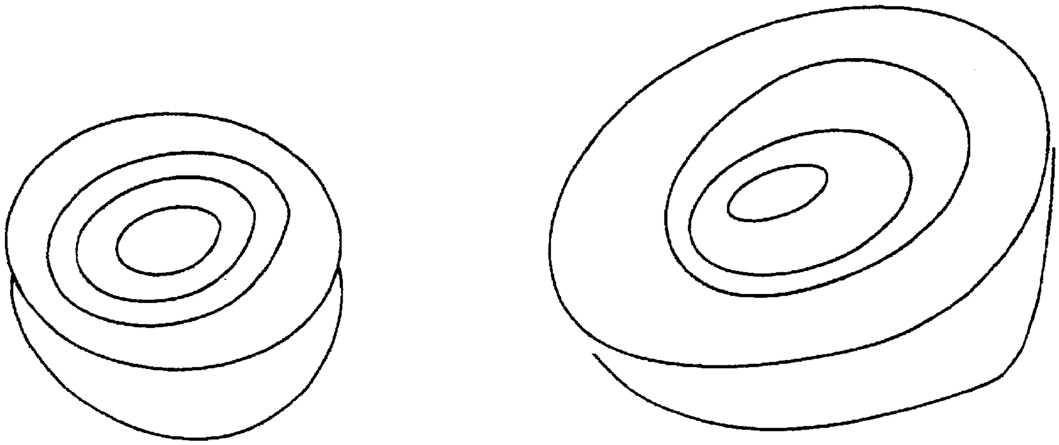

The examples heretofore have focused on substantially planar layers of luminescent material. The example decorative items of FIG. 14 do not utilize planar layers of luminescent material, but instead utilizes spherical luminescent shapes. As is shown, decorative items 301, 311 may comprise spheres with printing 303, 313 thereon which depict planetary surfaces such as the surface of the earth and the surface of the moon. A small hole 305, 315 may be provided in each sphere in order to allow a string 307, 317 to suspend the spheres at a predetermined distance from the ceiling or other structure (for example, a mobile structure). As is shown in FIG. 15, the spheres may be constructed in such a manner as to be separated into two hemispheres which mate together when suspended from a ceiling or other structure, but which can allow the hemispheres to be concentrically nested within one another to reduce the size of the object for transport and display.

FIGS. 16A, 16B, 16C, 16D, 16E, and 16F depict an alternative implementation of the present invention. In this particular implementation, a luminescent card is utilized first as an article to be mailed or presented (just like a greeting card). After receipt, selected portions are detached from the card and utilized for either decorative or utilitarian functions. Preferably, the detachable portions are either die stamped into the card or defined by preformed perforations. The luminescent card is strong enough to be sent through the mail, but the die markings or preformed perforations render the detachable portions relatively easily detached from the card.

This will be described first with reference to FIG. 16A. As is shown, a substantially planar card 405 is provided which includes a correspondence portion 403 and a mailing information portion 405, as well as a stamp or postage portion 407. This item 401 may take a number of sizes. Current U.S.

postal regulations mandate a minimum postcard size and a maximum postcard size. The current minimum postcard size is 3½ inches by 5 inches, with a thickness of no less than 0.007 inches thick. In contrast, the maximum postcard size under current regulations is 4.35 inches by 6 inches. The maximum thickness of a postcard is 0.016 inches thick. However, when the current invention is implemented in an envelope format as discussed above, the size range is considerably broader under current postal regulations. For example, current postal regulations will accept pieces which are 8½ inches by 11 inches. The current postal regulations also mandate large envelope sizes. A large envelope is taller than 6.125 inches, but no longer than 11.5 inches, nor any thicker than 0.25 inches. The basic concept is however that the particular size of the mailing piece is not limited to postcard size objects. For purposes of discussion however, FIG. 16 continues discussion with a postcard-sized object.

FIG. 16B depicts the front portion of item 401. As is shown, it includes a bookmark 411 which includes decorative pattern 413 thereon. The decorative pattern is a translucent image which is secured, affixed, or carried by the luminescent card 401. Bookmark 411 is a detachable object which may be detached by the recipient from item 401 and used separately. In the particular instance of FIG. 16B, bookmark 411 has a utilitarian function in that it is used to mark a place within books. It also has a decorative function since the translucent image 413 is carried by a bookmark 411 will be illuminated during the photoluminescent mode of operation. Detachable item bookmark 411 may be die cut or pre-perforated to allow for easy detachment of bookmark 411 from item 401. In the preferred embodiment of the present invention, the translucent image 413 is registered into position relative to the die cut or preformed perforations.

Figure 16C:
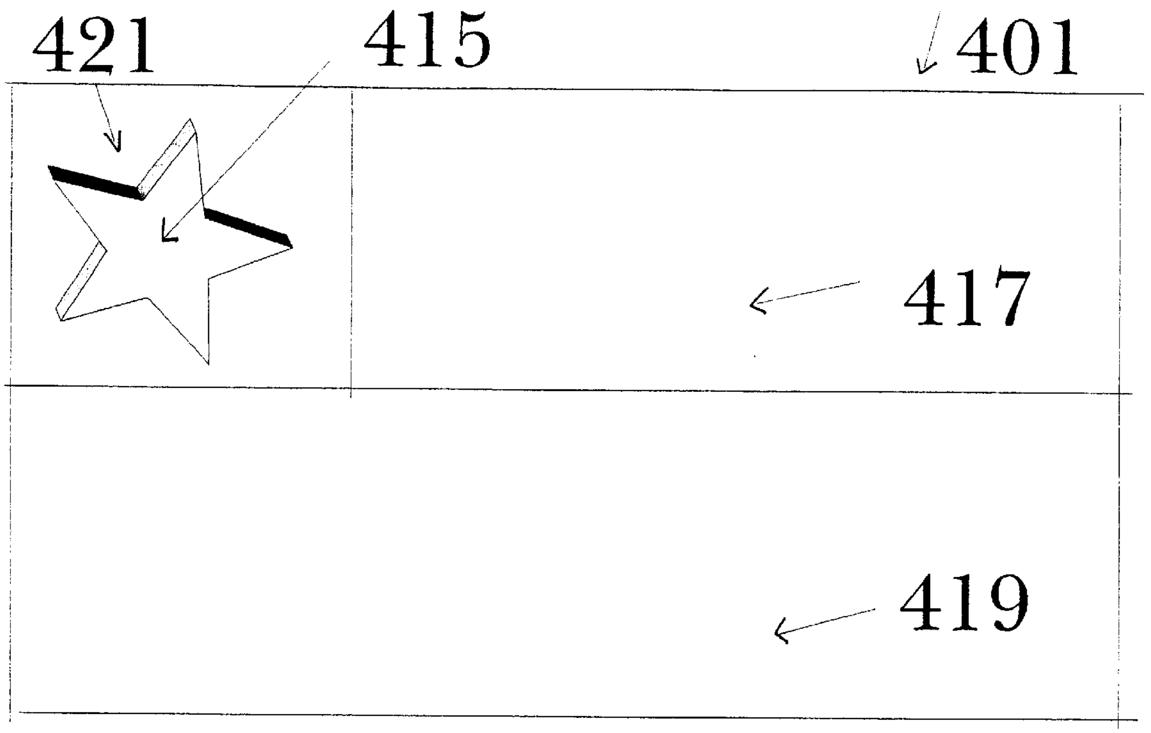

FIG. 16C depicts an alternative embodiment in which a luminescent image of a flag is provided on card 401. Essentially, the image of the flag may define a number of separately detachable and separately usable translucent portions. This may be defined by the selected die cuts or preformed perforations. For example, the image of the flag may be separated into rectangular-shaped bookmarks 417, 419, star shaped section 415 and rectangle 421 which includes a star shaped cut out of it. In other words, this image of the flag may be registered with predefined die cuts or preformed perforations in order to allow the detachable portions 415, 417, 419, 421 to be separately detached and separately used.

Figure 16D:
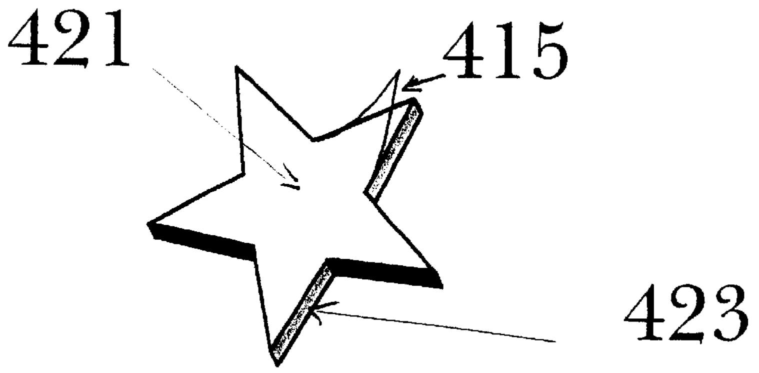

As is shown in FIG. 16D, one or more of these detachable items may include an adhesive backing which is masked by a removable portion which allows the object to be secured to a selected surface. For example, the star shaped detachable object 415 may include adhesive backing 423 which is covered by a releasable cover 421 which allows the star to be secured to a selected surface.

Figure 16E:
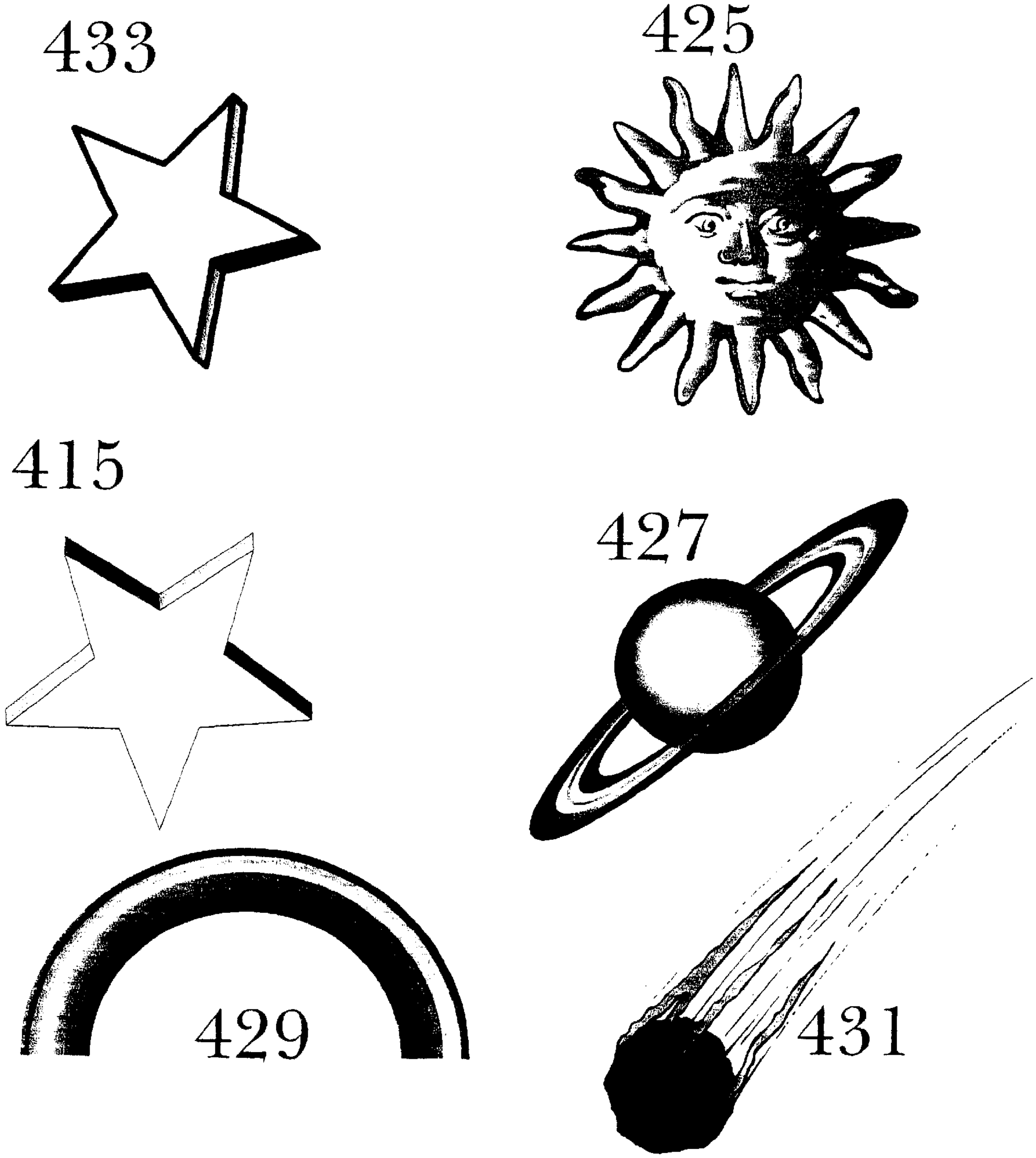
Figure 16F:
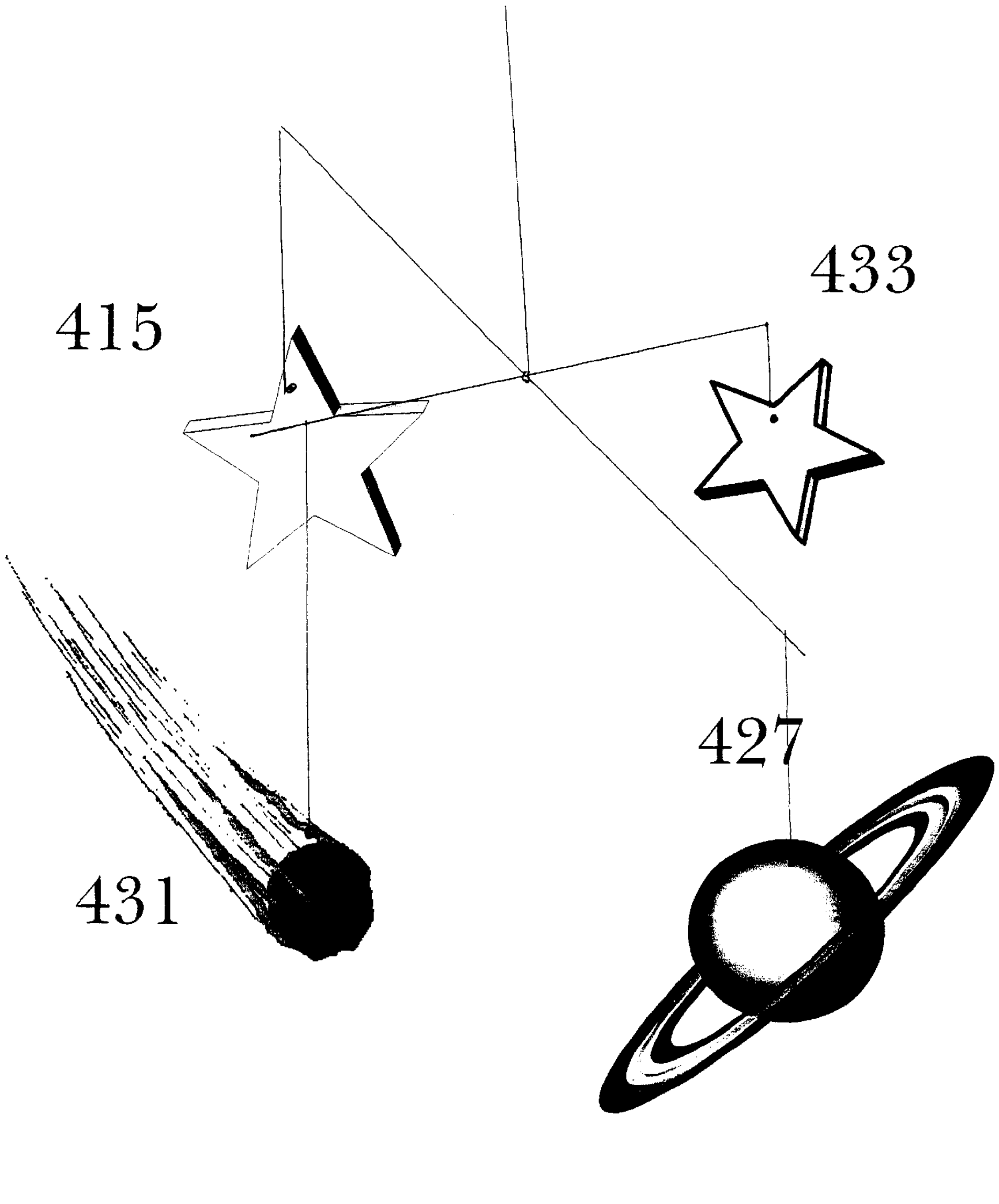

FIG. 16E depicts such a utilization. The star 415 may be assembled with other celestial objects such as the planet Saturn 427, a rainbow 429, a comet 431, another star 433, and the sun 425. Each of these celestial objects are provided with adhesive and adhesive covering to allow a child to detach the celestial object from a mailed card and place that object on the ceiling or wall in a playroom or bedroom. The luminescent material will energize during lighted conditions and will provide a visually appealing array of celestial luminescent objects on a wall or ceiling of the child's playroom or bedroom. An alternative utilization is depicted in FIG. 16F, wherein a mobile 433 is provided which allows the detachable object such as a star 415, star 433, planet Saturn 427, and comet 431 to be detached and secured to selected portions of the mobile armatures. The mobile may be placed in a selected location secured to a ceiling. Once again, the photo luminescent material will absorb energy during lighted conditions and will be luminescent in the dark providing an interesting array in three dimensions of particular decorative objects, such as the celestial objects.

Of course, the present invention is not limited to the particular decorative and utilitarian objects depicted in this application. Any one of a number of alternative or different decorative and/or utilitarian objects may be formed from the detachable portions.

What is claimed:

1. A decorative item, comprising:

(a) a layer of luminescent material;

(b) a translucent image printed onto said layer of luminescent material with a printer;

(c) said decorative item being operable during a plurality of modes of operation, including:

(1) an excitation mode of operative wherein said decorative item is exposed to a source of exciting energy; and (2) a delayed light emission mode of operation wherein said layer of luminescent material generates a phosphorescent light emission, after said source of exciting energy is removed, which passes through said translucent image making it visible in low light conditions.

2. A decorative item according to claim 1:

wherein said layer of luminescent material comprises a mixture of luminescent material and carrier.

3. A decorative item according to claim 1:

wherein said layer of luminescent material comprises a planar layer of luminescent material.

4. A decorative item according to claim 1:

wherein said layer of luminescent material comprises a planar and rigid layer of luminescent material.

5. A decorative item according to claim 1:

wherein said layer of luminescent material comprises luminescent material intermixed with a plastic material.

6. A decorative item according to claim 1, wherein said image comprises a photographic image.

7. A decorative item, comprising:

(a) a layer of luminescent material;

(b) a layer of transparent material, with a translucent image carried thereon;

(c) means for applying said layer of transparent material to said layer of luminescent material utilizing at least one of (1) printing, (2) screening, (3) photocopying, and (4) painting;

(d) said decorative item being operable during a plurality of modes of operation, including:

(1) an excitation mode of operative wherein said decorative item is exposed to a source of exciting energy; and (2) a delayed light emission mode of operation wherein said layer of luminescent material generates a phosphorescent light emission, after said source of exciting energy is removed, which passes through said transparent material rendering said translucent image which is affixed thereto visible in low light conditions.

8. A decorative item according to claim 7:

wherein said layer of luminescent material comprises a mixture of luminescent material and at least one binder.

9. A decorative item according to claim 7:

wherein said layer of luminescent material comprises a planar layer of luminescent material.

10. A decorative item according to claim 7:

wherein said layer of luminescent material comprises a planar and rigid layer of luminescent material.

11. A decorative item according to claim 7:

wherein said layer of luminescent material comprises luminescent material intermixed with a plastic material.

12. A decorative item according to claim 7:

wherein said layer of transparent material comprises a layer of transparent material with a translucent image printed thereto.

13. A decorative item according to claim 7, wherein said translucent image comprises a photographic image.

14. A decorative item according to claim 7, wherein said means for bonding comprises an adhesive material.

15. A decorative item, comprising:

(a) a planar and rigid layer of luminescent material;

(b) a translucent image applied to said luminescent material;

(c) said decorative item being operable during a plurality of modes of operation, including:

(1) an excitation mode of operative wherein said decorative item is exposed to a source of exciting energy; and (2) a delayed light emission mode of operation wherein said luminescent material generates a phosphorescent light emission, after said source of exciting energy is removed, which passes through said translucent image making it visible in low light conditions;

(d) printed material defining a correspondence portion for receipt of at least one of postal information and message information; and (e) wherein said luminescent material includes at least one detachable portion which may be separated by a recipient after receipt and utilized for at least one of (1) a decorative purpose, and (2) a utilitarian purpose.

16. A decorative item according to claim 15:

wherein said luminescent material comprises a mixture of luminescent material and carrier.

17. A decorative item according to claim 15:

wherein said luminescent material comprises a spherically- shaped luminescent material.

18. A decorative item according to claim 15, wherein said correspondence portion composes:

1. an address portion for receiving address information;
2. a message portion for receiving message information;
3. a message cover portion for concealing and protecting said message portion.

19. A decorative item according to claim 18, wherein said message cover portion comprises a panel member connected to said decorative item by at least perforated connector, which secures a message portion proximate said decorative item.

* * * * *